(12) United States Patent
Bougaev et al.

(10) Patent No.: US 7,797,262 B2
(45) Date of Patent: Sep. 14, 2010

(54) METHOD AND APPARATUS FOR EVALUATING THE COMPLEXITY OF HUMAN-IN-THE-LOOP PROCESSES

(75) Inventors: Anton A. Bougaev, Lafayette, IN (US); Aleksey M. Urmanov, San Diego, CA (US); Kenny C. Gross, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 870 days.

(21) Appl. No.: 11/606,464

(22) Filed: Nov. 29, 2006

(65) Prior Publication Data

US 2008/0126011 A1    May 29, 2008

(51) Int. Cl.
*G06F 17/00*    (2006.01)
*G06N 5/00*    (2006.01)

(52) U.S. Cl. .......................................................... 706/45

(58) Field of Classification Search .................... 706/45
See application file for complete search history.

(56) References Cited

U.S. PATENT DOCUMENTS

2007/0172803 A1 *    7/2007    Hannaford et al. .......... 434/262

* cited by examiner

*Primary Examiner*—Donald Sparks
*Assistant Examiner*—Li-Wu Chang
(74) *Attorney, Agent, or Firm*—Park, Vaughan & Fleming, LLP

(57) ABSTRACT

One embodiment of the present invention provides a system that determines the complexity of a transaction between a first entity and a second entity. The system starts by determining a first probability of success for a portion of the transaction which is associated with actions of the first entity. The system then determines a second probability of success for a portion of the transaction which is associated with actions of the second entity. The system next calculates a transactional complexity for the transaction based on the first probability of success and the second probability of success.

13 Claims, 3 Drawing Sheets

METHOD AND APPARATUS FOR EVALUATING THE COMPLEXITY OF HUMAN-IN-THE-LOOP PROCESSES

BACKGROUND

1. Field of the Invention

The present invention relates generally to the field of human factors engineering. More specifically, the present invention relates to a method and apparatus for evaluating the complexity of a human-in-the-loop process.

2. Related Art

One of the goals of computer system design is to maximize the effectiveness of the relationship between humans and computers. Hence, computer system designers spend a considerable amount of time designing systems with efficient operational and service interfaces for humans. For example, a designer may decide to decrease the number of steps required to swap out a failed disk drive in a server to make the server easier for technicians to service. Designers typically make this type of design decision based on rough estimates of the complexity of a given transaction or process involving a human and a computer system.

As computer systems continue to become more complicated, accurately estimating the complexity of processes involving humans and computer systems becomes increasingly more difficult. For processes that do not involve a human being, determining the complexity of a process can be straightforward. For example, conventional approaches have used structural, informational, or descriptive complexity formulae and have introduced various measures to determine the complexity of the specific processes. Unfortunately, these conventional approaches do not consider a human as part of the system during the evaluation process. Consequently, these conventional approaches cannot be used to evaluate processes which involve a human in the loop.

Hence, what is needed is a method and an apparatus for measuring the complexity of processes involving a human in the loop.

SUMMARY

One embodiment of the present invention provides a system that determines the complexity of a transaction between a first entity and a second entity. The system starts by determining a first probability of success for a portion of the transaction which is associated with actions of the first entity. The system then determines a second probability of success for a portion of the transaction which is associated with actions of the second entity. Next, the system calculates a transactional complexity for the transaction based on the first probability of success and the second probability of success.

In a variation on this embodiment, the first entity is: (1) a software application; (2) a hardware structure; or (3) a computer system.

In a variation on this embodiment, the second entity is: (1) a software application; (2) a hardware structure; or (3) a human.

In a variation on this embodiment, the system determines the first probability of success by combining transition probabilities from a state diagram associated with the first entity to produce a transition probability from an initial state to a final state for the first entity.

In a variation on this embodiment, the system determines the second probability of success by combining transition probabilities from a state diagram associated with the second entity to produce a transition probability from an initial state to a final state for the second entity.

In a variation on this embodiment, state transition probabilities for a human are determined through empirical observations of the human.

In a variation on this embodiment, the system calculates the transactional complexity by calculating the natural log of the inverse of the product of the first probability of success and the second probability of success.

In a variation on this embodiment, the system calculates an inter-complexity for a set of transactions by calculating a sum of probability-weighted transactional complexities for each transaction.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Computer System

Figure 1:
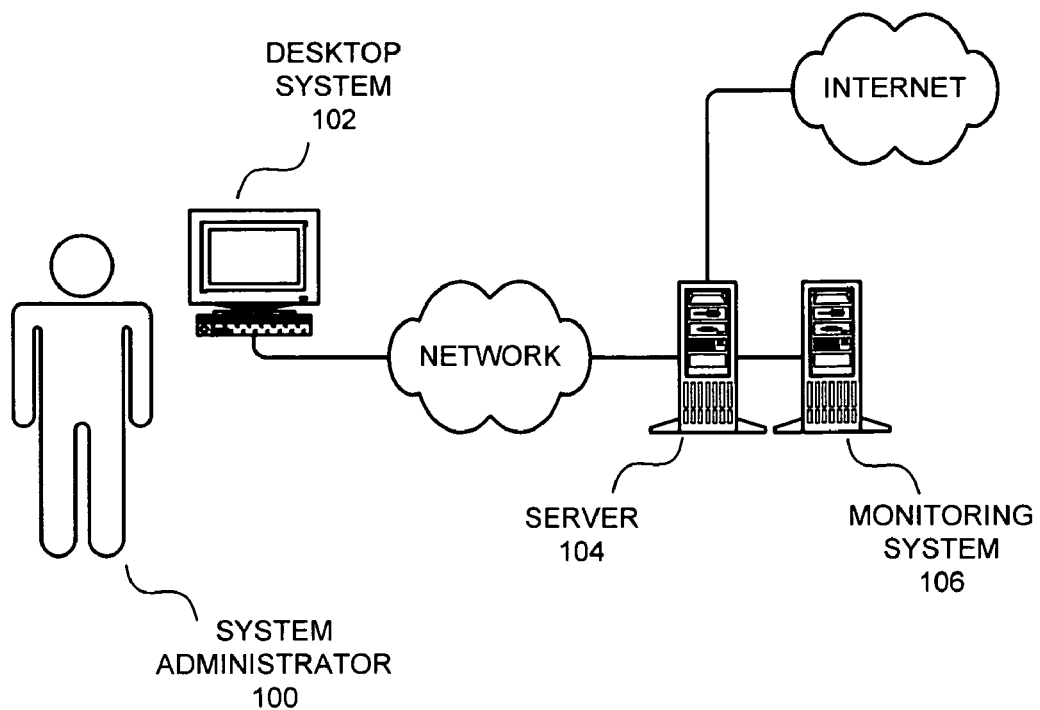
FIG. 1 illustrates a computer system in accordance with an embodiment of the present invention.

FIG. 1 illustrates a computer system in accordance with an embodiment of the present invention. This computer system includes desktop system 102, server 104, and monitoring system 106. Desktop system 102 is a desktop computer which is coupled through a network to server 104. Server 104 includes several high-capacity disk drives and a router to provide desktop system 102 with data storage and Internet access. A system administrator 100 operating desktop system 102 can use applications on desktop system 102 to perform system maintenance operations on server 104.

Monitoring system 106 is an automated monitoring system that records information relating to the success or failure of processes involving server 104.

During an exemplary human-in-the-loop process, when a disk drive in server 104 fails, system administrator 100 removes the failed disk drive and replaces the failed drive with an operational drive. The process of replacing a disk drive can modeled a number of "states" and transitions between the states which form a "transaction." For example, a user state is associated with system administrator 100 using desktop system 102 to request server 104 to provide the status of any failed disk drives. A corresponding system state is associated with server 104 identifying a failed disk drive. Another user state is associated with system administrator 100 commanding server 104 to logically remove a disk drive from server 104's directory structure, and a corresponding server state is associated with server 104 logically removing the disk drive. As system administrator 100 and server 104 move through these states, monitoring system 106 determines whether the each state transition was successful and records data about the success of the transition.

Note that monitoring system 106 is presented as a separate system for the purpose of illustration. In another embodiment, monitoring system 106 is part of server 104's hardware.

In one embodiment of the present invention, recording data about the success of a transaction involves collecting data about processes which cannot be collected by monitoring system 106. Instead, this data is collected by other entities (e.g., a system administrator). For example, if the process involves replacing a system board, one state may be associated with identifying the correct system board. If the transition to this state fails, the system administrator 100 records data about the failure. In this embodiment, a combination of the data recorded by monitoring system 106 (if such data exists) and the data recorded by other entities is used to compute the complexity of specific processes.

Calculating Transactional Complexity

Figure 2:
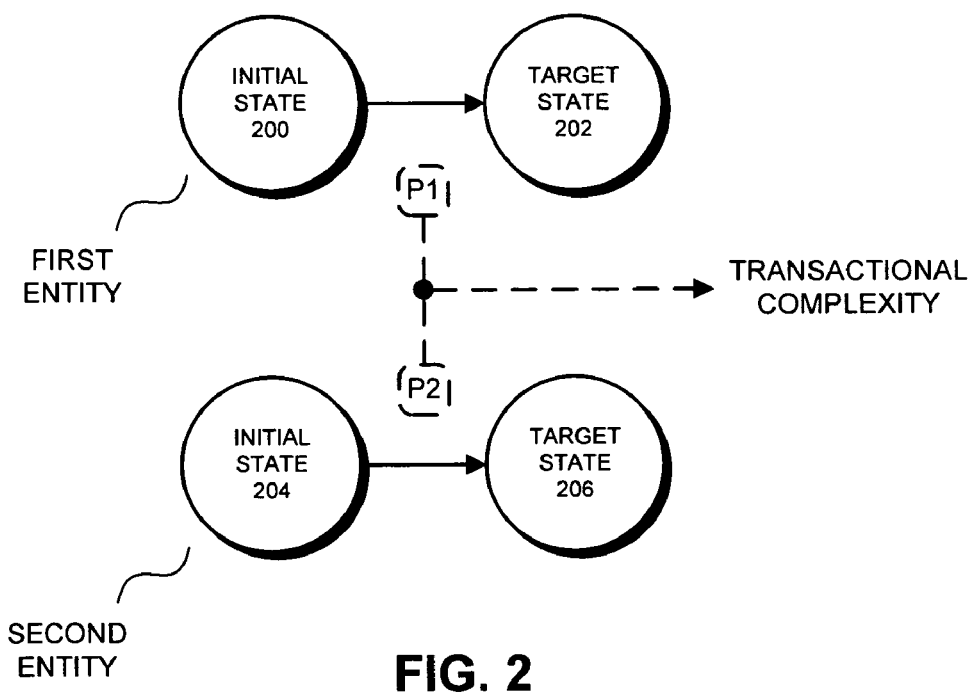
FIG. 2 illustrates the process of computing transactional complexity in accordance with an embodiment of the present invention.

FIG. 2 illustrates the process of computing transactional complexity in accordance with an embodiment of the present invention. The technique introduced herein utilizes the notion of "inter-complexity." Unlike conventional approaches, which obscure the evaluation of complexity of interacting entities, the approach introduced herein facilitates evaluation of the complexity of human-machine systems and interacting processes in a quantitative (as opposed to a subjective) manner.

Two interacting entities with their associated state spaces are considered. Each of two entities performs a transition from an initial state (such as initial states 200 and 204) to a specified state called a "target state" (such as target states 202 and 206). It is assumed that the probabilities of successful transition from the initial to the target state, denoted by P1 and P2, respectively, can be estimated.

The attempt of this pair of entities to move from their initial to their target states is defined as their "transaction." In one embodiment of the present invention, the complexity of the transaction is defined as the natural logarithm of an inverse of the product of the probabilities of successful transitions from initial states to target states for each of the entities, and is called the "transactional complexity" (TC). For example, as shown in FIG. 2, the probability of a first entity transitioning successfully from an initial state to a target state is "P1," while the probability of a second entity transitioning successfully from an initial state to a target state is "P2." Hence, the transactional complexity of this transaction can be calculated as: ln(1/(P1\*P2)).

Note that a pair of entities can perform one or more different transactions. Each of these transactions occurs with a certain probability $P_{ti}$. The weighted sum of the transactional complexities defines the "inter-complexity." One embodiment of the present invention allows an elegant estimate of complexity on different levels of granularity.

In the preceding section, we presented an example of a system administrator 100 swapping out a failed disk drive to illustrate a transaction. More generally, however, a transaction can occur when any set of entities collectively perform an operation. For example, a transaction may involve an operating system (OS) initializing a peripheral card. This transaction may include a query by the OS to determine what types of peripheral cards are present on a peripheral bus and a corresponding response from the peripheral card as well as subsequent initialization-related operations.

Example Transaction

Figure 3:
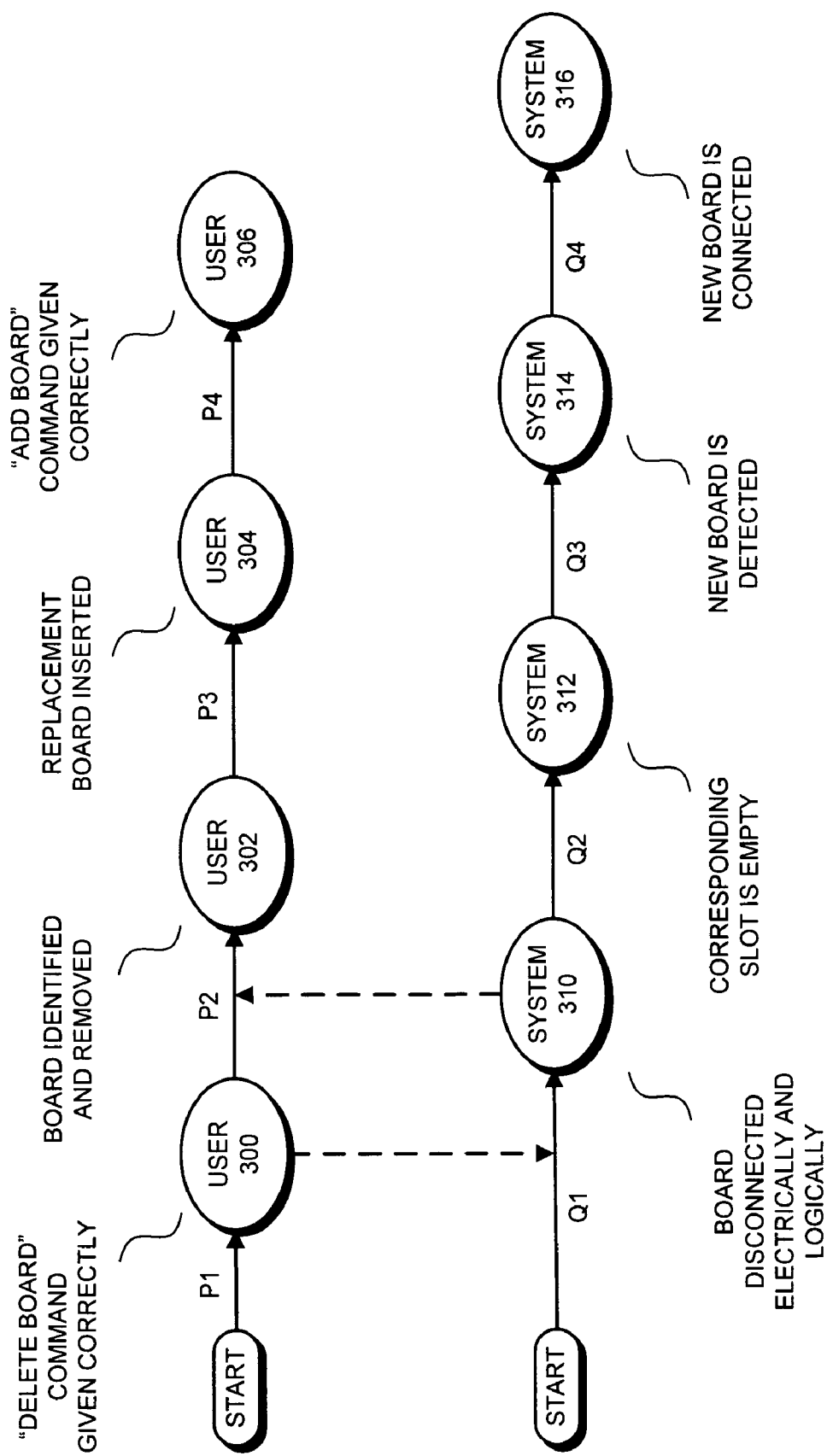
FIG. 3 illustrates a transaction in accordance with an embodiment of the present invention.

FIG. 3 illustrates the states involved in hot-swapping a circuit board in server 104 in accordance with an embodiment of the present invention. In FIG. 3, states "user" 300-306 are associated with the actions of a system administrator 100, while states "system" 310-316 are associated with the actions of server 104. For example, at state "system 312," server 104 recognizes that the circuit board slot is empty. The dashed lines between the states in the transaction represent exemplary communications between desktop system 102 and server 104 which result from actions of each entity.

The transaction starts when system administrator 100 accesses server 104 through desktop system 102. The first state in the transaction is associated with system administrator 100 entering a "delete board" command into the server for a circuit board that has failed. As system administrator 100 subsequently performs the remaining steps associated with replacing the circuit board, she transitions from the starting state to the target state "user 306" where the replacement of the circuit board is complete. "PN" represents the probability that system administrator 100's part of the transaction completes successfully.

As can be seen from the dashed line descending from state "user 300" to the system's states, the successful entry of the "delete board" command causes desktop system 102 to make a "delete board" communication to server 104. In response to this communication, server 104 commences performing steps associated with replacing the circuit board. During this process, server 104 transitions from an initial state to a target state "system 316" where the replacement of the circuit board is complete. "QN" represents the probability that server 104's part of transaction completes successfully.

Given the probabilities of making successful transitions between each of the states in the diagram, the probability of transitioning to the target state (e.g., state "user 306" for the system administrator) for each entity in the transaction can be determined. For example, in the transaction described above, system administrator 100 has a probability "PN" and server 104 has a probability "QN" of transitioning to their respective target states.

From these probabilities, the transactional complexity for the transaction can be calculated. Calculation of the transactional complexity involves putting the probabilities into the formula described in the previous section. Furthermore, given a set of transactions, the inter-complexity of the set of transactions can calculated. The inter-complexity of the set of transactions is the probability-weighted sum of the transactional complexities, as shown in the following formula:

$$\text{inter-complexity} = -\sum_{i=1}^{n} P_{ti} * \ln(P_{1i} * P_{2i}).$$

Transactional Complexity and Inter-Complexity Flowchart

Figure 4:
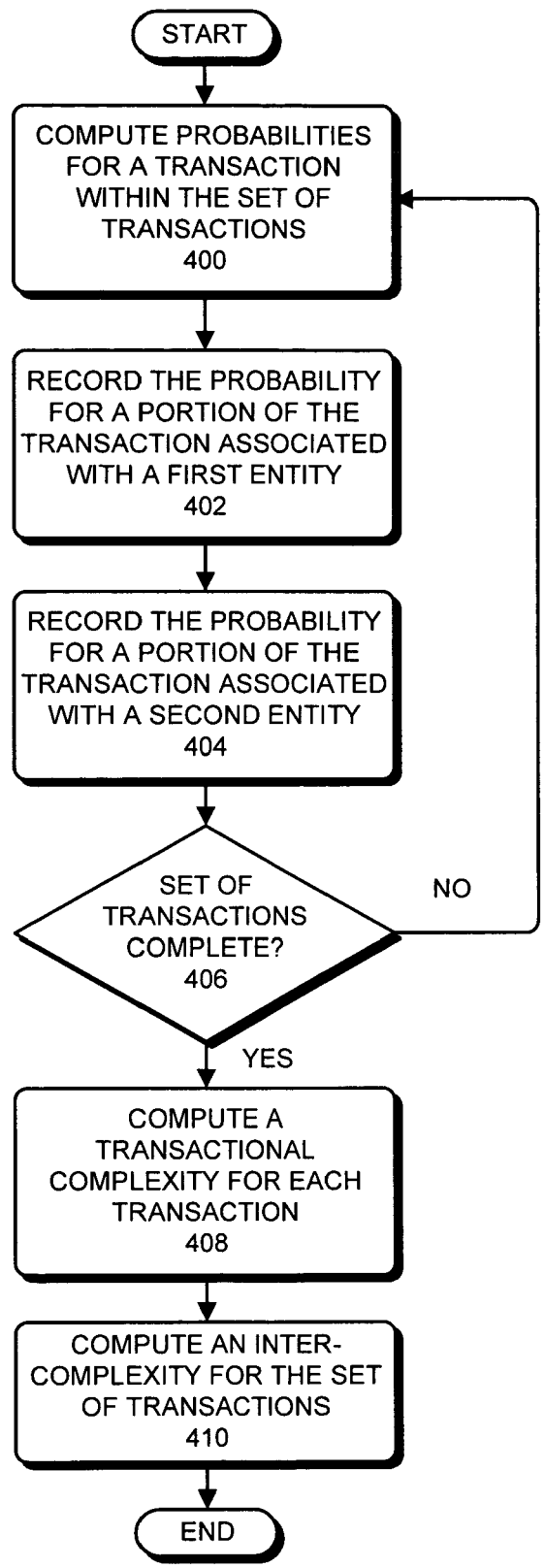
FIG. 4 presents a flowchart illustrating the process of computing transactional complexities and an inter-complexity for a set of transactions in accordance with an embodiment of the present invention.

FIG. 4 presents a flowchart illustrating the process of computing transactional complexities and inter-complexity for a set of transactions in accordance with an embodiment of the present invention. The process starts with using state diagram to compute the probabilities of a first and second entity completing their respective portions of a transaction within a set of transactions (step 400). Recall that this computation involves combining transition probabilities between states in a transition diagram (see FIG. 2).

Next, the system records the probability of success for the portion of the transaction associated with the first entity (step 402). The system also records the probability of success for the portion of the transaction associated with the second entity (step 404).

The system then determines if probabilities for the set of transactions have all been computed (step 406). If not, the system returns to step 400 to compute the probability for the next transaction within the set of transactions.

Otherwise, the probability computation for the set of transactions is complete and the system can calculate an inter-complexity for the set of transactions. In order to calculate the inter-complexity for the set of transactions, the system first calculates the transactional complexity for each transaction (step 408). The system then uses the calculated transactional complexities to compute the inter-complexity for the series of transactions (step 410).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A non-transitory computer-readable storage medium storing instructions that when executed by a computer cause the computer to perform a method for determining a complexity of a transaction between a first entity and a second entity, wherein the first entity interacts with the second entity, and wherein the second entity is a human, comprising:
   determining a first probability of success for a first portion of the transaction which is associated with actions of the first entity;
   determining a second probability of success for a second portion of the transaction which is associated with actions of the second entity;
   calculating a transactional complexity for the transaction based on the first probability of success and the second probability of success, wherein calculating the transactional complexity involves calculating the natural log of the inverse of the product of the first probability of success and the second probability of success; and
   calculating an inter-complexity for a set of transactions by calculating a sum of probability-weighted transactional complexities for each transaction.

2. The computer-readable storage medium of claim 1, wherein the first entity is a software application, a hardware structure, or a computer system.

3. The computer-readable storage medium of claim 2, wherein determining the first probability of success involves combining transition probabilities from a state diagram associated with the first entity to produce a transition probability from an initial state to a final state for the first entity.

4. The computer-readable storage medium of claim 2, wherein determining the second probability of success involves combining transition probabilities from a state diagram associated with the second entity to produce a transition probability from an initial state to a final state for the second entity.

5. The computer-readable storage medium of claim 4, wherein state transition probabilities for a human are determined through empirical observations of the human.

6. An apparatus for determining a complexity of a transaction between a first entity and a second entity, wherein the first entity interacts with the second entity, and wherein the second entity is a human, comprising:
   a processor in a computing device configured to:
      determine a first probability of success of a first portion for the transaction which is associated with actions of the first entity and a second probability of success for a second portion of the transaction which is associated with actions of the second entity; and
      calculate a transactional complexity for the transaction based on the first probability of success and the second probability of success, wherein calculating the transactional complexity involves calculating the natural log of the inverse of the product of the first probability of success and the second probability of success;
      calculate an inter-complexity for a set of transactions by calculating a sum of probability-weighted transactional complexities for each transaction.

7. The apparatus of claim 6, wherein the first entity is a software application, a hardware structure, or a computer system.

8. The apparatus of claim 7, wherein the determining mechanism is configured to combine transition probabilities from a state diagram associated with the first entity to produce a transition probability from an initial state to a final state for the first entity.

9. The apparatus of claim 7, wherein the determining mechanism is configured to combine transition probabilities from a state diagram associated with the second entity to produce a transition probability from an initial state to a final state for the second entity.

10. A computer system for determining a complexity of a transaction between a first entity and a second entity, wherein the first entity interacts with the second entity, and wherein the second entity is a human, comprising:
    a processor;
    a memory coupled to the processor, wherein the memory is configured to hold data and instructions for the processor;
    a determining mechanism coupled to the processor which is configured to determine a first probability of success for a first portion of the transaction which is associated with actions of the first entity and a second probability of success for a second portion of the transaction which is associated with actions of the second entity; and
    a calculating mechanism coupled to the processor that is configured to calculate a transactional complexity for the transaction based on the first probability of success and the second probability of success, wherein calculating the transactional complexity involves calculating the natural log of the inverse of the product of the first probability of success and the second probability of success;
    wherein the calculating mechanism is further configured to calculate an inter-complexity for a set of transactions by calculating a sum of probability-weighted transactional complexities for each transaction.

11. The computer system of claim 10, wherein the first entity is a software application, a hardware structure, or the computer system.

12. The computer system of claim 11, wherein the determining mechanism is configured to combine transition probabilities from a state diagram associated with the first entity to produce a transition probability from an initial state to a final state for the first entity.

13. The computer system of claim 11, wherein the determining mechanism is configured to combine transition probabilities from a state diagram associated with the second entity to produce a transition probability from an initial state to a final state for the second entity.

* * * * *